United States Patent
Kang et al.

(10) Patent No.: US 8,054,341 B2
(45) Date of Patent: Nov. 8, 2011

(54) PHOTOGRAPHING APPARATUS FOR SUPPORTING OVERRIDING MODE AND METHOD OF CONTROLLING SAME

(75) Inventors: Min-su Kang, Suwon-si (KR); Kang-min Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 331 days.

(21) Appl. No.: 12/534,255

(22) Filed: Aug. 3, 2009

(65) Prior Publication Data

US 2010/0026845 A1    Feb. 4, 2010

(30) Foreign Application Priority Data

Aug. 4, 2008    (KR) .................. 10-2008-0076113

(51) Int. Cl.
*H04N 5/76*    (2006.01)
(52) U.S. Cl. .................. 348/231.99; 348/231.2
(58) Field of Classification Search .......... 348/231.99, 348/231.2
See application file for complete search history.

(56) References Cited

U.S. PATENT DOCUMENTS

| | | | | |
|---|---|---|---|---|
| 6,563,535 | B1* | 5/2003 | Anderson | 348/231.2 |
| 6,754,279 | B2* | 6/2004 | Zhou et al. | 375/240.28 |
| 6,873,658 | B2* | 3/2005 | Zhou | 375/240.25 |
| 7,689,046 | B2* | 3/2010 | Emmett et al. | 382/232 |
| 7,719,579 | B2* | 5/2010 | Fishman et al. | 348/231.99 |
| 7,787,026 | B1* | 8/2010 | Flory et al. | 348/231.99 |
| 2007/0041391 | A1* | 2/2007 | Lin et al. | 370/412 |

* cited by examiner

*Primary Examiner* — James Hannett
(74) *Attorney, Agent, or Firm* — Drinker Biddle & Reath LLP (57) ABSTRACT

A digital photographing apparatus including an imaging device configured to continuously output image data of a subject in units of frames according to a predetermined drive clock, during consecutive photographing; a buffer memory configured to store a plurality of image frames output by the imaging device; a memory checking unit configured to detect a data overflow of the buffer memory; a digital signal processor configured to perform an overriding operation of sacrificing previously stored frame data and storing image frames recently obtained after the data overflow occurs in the buffer memory in replacement of the sacrificed framed data; and a recording medium configured to store the image frames in the buffer memory in the form of files.

20 Claims, 4 Drawing Sheets

PHOTOGRAPHING APPARATUS FOR SUPPORTING OVERRIDING MODE AND METHOD OF CONTROLLING SAME

CROSS-REFERENCE TO RELATED PATENT APPLICATION

This application claims the benefit of Korean Patent Application No. 10-2008-0076113, filed on Aug. 4, 2008 in the Korean Intellectual Property Office, the entire contents of which is incorporated herein by reference.

BACKGROUND OF THE INVENTION

1. Field of the Invention

The present invention relates to a photographing apparatus for preserving recently obtained images after a memory overflow, and a method of controlling the photographing apparatus.

2. Description of the Related Art

Recently released digital cameras support a usual photographing mode in which photographing is separately performed in response to a single shutter manipulation and a consecutive photographing mode in which photographing is continuously performed in response to a single shutter manipulation. With the advance in digital camera technology, digital cameras capable of high-speed consecutive photographing have been developed. Because of the high-speed, it may be difficult to store the images obtained from a high-speed consecutive photographing mode.

SUMMARY OF THE INVENTION

An embodiment of the invention is disclosed in the form of a digital camera that includes an imaging device configured to continuously output image data of a subject in units of frames according to a predetermined drive clock, accompanied by consecutive photographing; a buffer memory configured to store a plurality of image frames output by the imaging device; a memory checking unit configured to detect a data overflow of the buffer memory; a digital signal processor configured to perform an overriding operation of sacrificing previously stored frame data and storing image frames recently obtained after the data overflow occurs in the buffer memory in replacement of the sacrificed framed data; and a recording medium configured to store the image frames in the buffer memory in the form of files.

The digital signal processor may be configured to sacrifice the most recently obtained previous frame data that is not being transferred to the recording medium.

The digital signal processor may be configured to process the obtained image data in a first-input first-output (FIFO) order.

The buffer memory may be configured to store raw data obtained from the imaging device and compression data obtained by compression encoding the raw data, and the digital signal processor may be configured to sacrifice raw data and compression data of the previous frame data.

The digital signal processor may be configured to overwrite the image frames that were recently obtained to a memory area in which the previous frame data is stored.

An embodiment of the invention is disclosed as a digital camera including an imaging device configured to continuously output image data of a subject in units of frames according to a predetermined drive clock, and to photograph consecutively; a buffer memory configured to store a plurality of image frames output by the imaging device; a memory checking unit configured to detect a data overflow of the buffer memory; a digital signal processor configured to selectively perform an overriding operation of sacrificing previously stored frame data and storing image frames recently obtained after the data overflow occurs in the buffer memory in replacement of the sacrificed framed data, and configured to perform a general photographing operation of stopping storing of the image frames in the buffer memory after the data overflow occurs, according to a photographing mode selected by a user; and a recording medium configured to store the image frames stored in the buffer memory in the form of files.

The digital signal processor in the overriding operation may be configured to sacrifice previous frame data that is not being transferred to the recording medium.

The digital signal processor in the overriding operation may be configured to sacrifice the most recently obtained previous frame data that is not being transferred to the recording medium.

The image frames may be overwritten that were recently obtained to a memory area in which the previous frame data is stored in the overriding operation.

A method of controlling a digital camera is disclosed. The method includes: storing a plurality of image frames output by an imaging device in units of frames in a buffer memory, during consecutive photographing; detecting a data overflow exceeding a storage capacity limit of the buffer memory; performing an overriding operation of sacrificing previously stored frame data and storing image frames recently obtained after the data overflow occurs in the buffer memory in replacement of the sacrificed framed data; and filing the image frames stored in the buffer memory and storing the image frames in a recording medium.

Performing of the overriding operation may include: sacrificing the previous frame data that is not being transferred from the buffer memory to the recording medium.

The method may include transferring the previous frame data from the buffer memory to the recording medium in a FIFO order.

The temporary storing of the plurality of image frames may include storing raw data obtained from the imaging device and compression data obtained by compression encoding the raw data in the buffer memory, wherein the performing of the overriding operation comprises: sacrificing raw data and compression data of the previous frame data.

The performing of the overriding operation may include overwriting the image frames that were recently obtained to a memory area in which the previous frame data is stored.

A method of controlling a digital camera is disclosed. The method including: storing a plurality of image frames output by an imaging device in units of frames in a buffer memory, during consecutive photographing; detecting a data overflow exceeding a storage capacity limit of the buffer memory; if the data overflow is detected, checking a user's selection of a general photographing mode or an overriding mode; if the user's selection is found to be the overriding mode, performing an overriding operation of sacrificing previously stored frame data and storing the image frames recently obtained after the data overflow occurs in the buffer memory in replacement of the sacrificed framed data; and storing the image frames stored in the buffer memory in a recording medium in the form of files.

Performing of the overriding operation may include sacrificing previous frame data that is not being transferred from the buffer memory to the recording medium.

The method may include transferring the previous frame data from the buffer memory to the recording medium a FIFO order.

The performing of the overriding operation may include overwriting the image frames that were recently obtained to a memory area in which the previous frame data is stored.

The temporary storing of the plurality of image frames may include storing raw data obtained from the imaging device and compression data obtained by compression encoding the raw data in the buffer memory, wherein the performing of the overriding operation comprises: sacrificing raw data and compression data of the previous frame data.

The method may include if the user's selection is found to be the general photographing mode, stopping storing of the image frames in the buffer memory after the data overflow occurs.

A method of operating a digital photographing apparatus is disclosed. The method may include capturing a new image during a consecutive photographing operation; detecting an overflow in a buffer memory; selecting a previously stored image in the buffer memory to sacrifice; replacing the previously stored image to sacrifice with the new image; compressing the new image; and transferring the new image from the buffer memory to a recording medium.

Replacing may include replacing raw data and compressed data of the previous stored image to sacrifice with the new image.

Selecting may include selecting a previously stored image in the buffer memory to sacrifice based on a time when the image was obtained.

Selecting may include selecting the last image stored in the buffer memory to sacrifice that is not being transferred from the buffer memory to the recording medium.

BRIEF DESCRIPTION OF THE DRAWINGS

The above and other features and advantages of the present disclosure will become more apparent by describing in detail exemplary embodiments thereof with reference to the attached drawings in which.

DETAILED DESCRIPTION OF THE INVENTION

The present disclosure will now be described more fully with reference to the accompanying drawings, in which exemplary embodiments are shown.

A photographing apparatus may be a mobile device having an appropriate photographing function. Examples of a photographing apparatus, include but are not limited to, a camera, a camcorder, a cellular phone, and a PDA.

Figure 1:
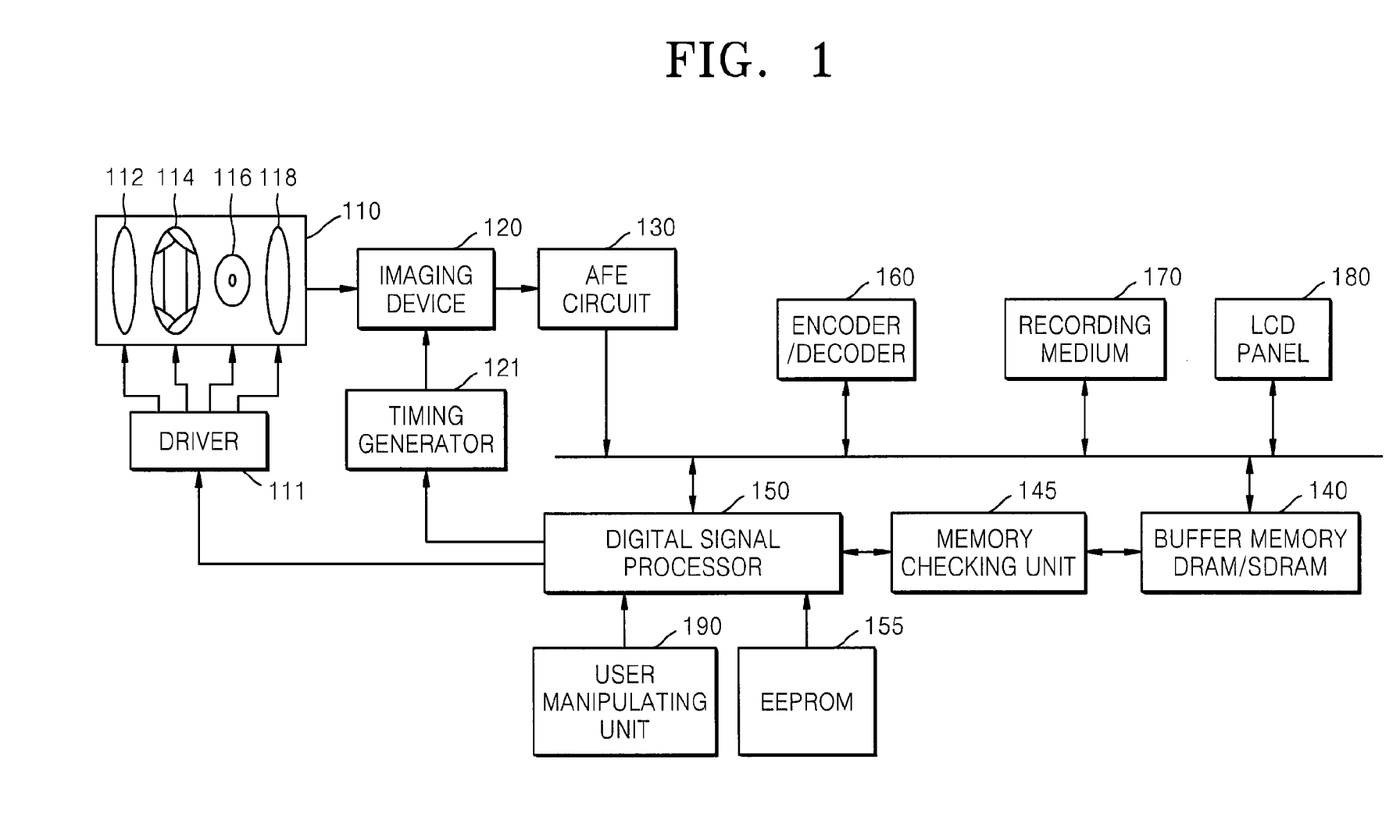
FIG. 1 is a block diagram of an example of a digital camera.

FIG. 1 is a block diagram of an example of a photographing apparatus as a digital camera. Referring to FIG. 1, the digital camera comprises an optical unit 110 that includes a plurality of optical lenses and forms an image of a subject on an imaging surface, an imaging device 120 that photoelectrically converts the image of the subject passing through the optical unit 110 into an electrical signal, an analog front end (AFE) circuit 130 that processes an output signal of the imaging device 120 and converts the output signal into a quantized digital image signal, a buffer memory 140 that stores image data output by the imaging device 120 in a unit of a frame and provides a job area for processing a signal, a recording medium 170 that stores compressed image data stored in the buffer memory 140 in the form of a file, and a digital signal processor 150 that generally controls general data flow and each component. The digital camera may further include a user manipulating unit 190 that includes a plurality of input mechanisms for sensing a user's manipulation and acts as an input/output device and an LCD panel 180 that receives an image signal from the digital signal processor 150 and displays the image signal on a screen.

The optical unit 110 includes a zoon lens 112 that moves back and forth according to an optical axis direction and varies a focal distance, a shutter 114 and an iris 116 that control an exposure time and an amount of light incident to the imaging device 120, and a focus lens 118 that adjusts a focus of the image of the subject formed on the imaging device 120. The zoon lens 112, the shutter 114, the iris 116, and the focus lens 118 are driven by an actuating motor (not shown) that is controlled by a driver 111.

The imaging device 120 is, for example, a charge coupled diode (CCD) image sensor or a complementary metal-oxide semiconductor (CMOS) image sensor that photoelectrically converts the image of the subject incident through the optical unit 110 into the electrical image signal. The operation of the imaging device 120 may be controlled by the digital signal processor 150 via a timing generator (TG) 121. The imaging device 120 may perform a one at a time photographing operation in response to a single shutter event, and/or may perform a consecutive photographing operation in response to a single shutter event. In the consecutive photographing operation, an exposure to the image device 120 and reading of data viewed on one screen may be continuously performed according to a predetermined drive clock.

The AFE circuit 130 performs a sample hold using a correlated double sampling (CDS) so that the output signal of the imaging device 120 maintains a high signal-to-noise ratio (SNR), performs an auto gain control (AGC) of an image signal, and performs an analog digital conversion (ADC) to convert analog image signals output by the imaging device 120 into digital image signals.

The buffer memory 140 stores the digital image signals quantized by the AFE circuit 130 in units of frames. An encoder/decoder 160 accesses the buffer memory 140, extracts the image data stored in the buffer memory 140 in units of frames, converts the images data into encrypted compression data according to a defined compression method such as Joint Photographic Expert Group (JPEG) or Moving Picture Expert Group (MPEG), and stores the compressed image data in the recording medium 170.

The digital signal processor 150 controls a general operation of the digital camera regarding image photographing and image data processing. Additionally, the digital signal processor 150 controls an operation of storing the image data obtained from the image device 120 in the buffer memory 140 in units of frames and controls an operation of outputting the image data stored in the buffer memory 140 in units of frames and storing the image data in the recording medium 170. In addition, the digital signal processor 150 supports an overriding mode in which the image data is prioritized according to time. Recently obtained image data may be processed according to a first-input first-output (FIFO) order in a consecutive photographing operation. The overriding mode will be described in more detail later.

The buffer memory 140 is a volatile memory providing a job area for processing data, such as a dynamic random access memory (DRAM) or a synchronous DRAM (SDRAM). The buffer memory 140 temporarily accumulates a series of image frames output when the consecutive photographing operation is resumed, so as to compensate for differences between a processing speed of each operation.

Figure 2:
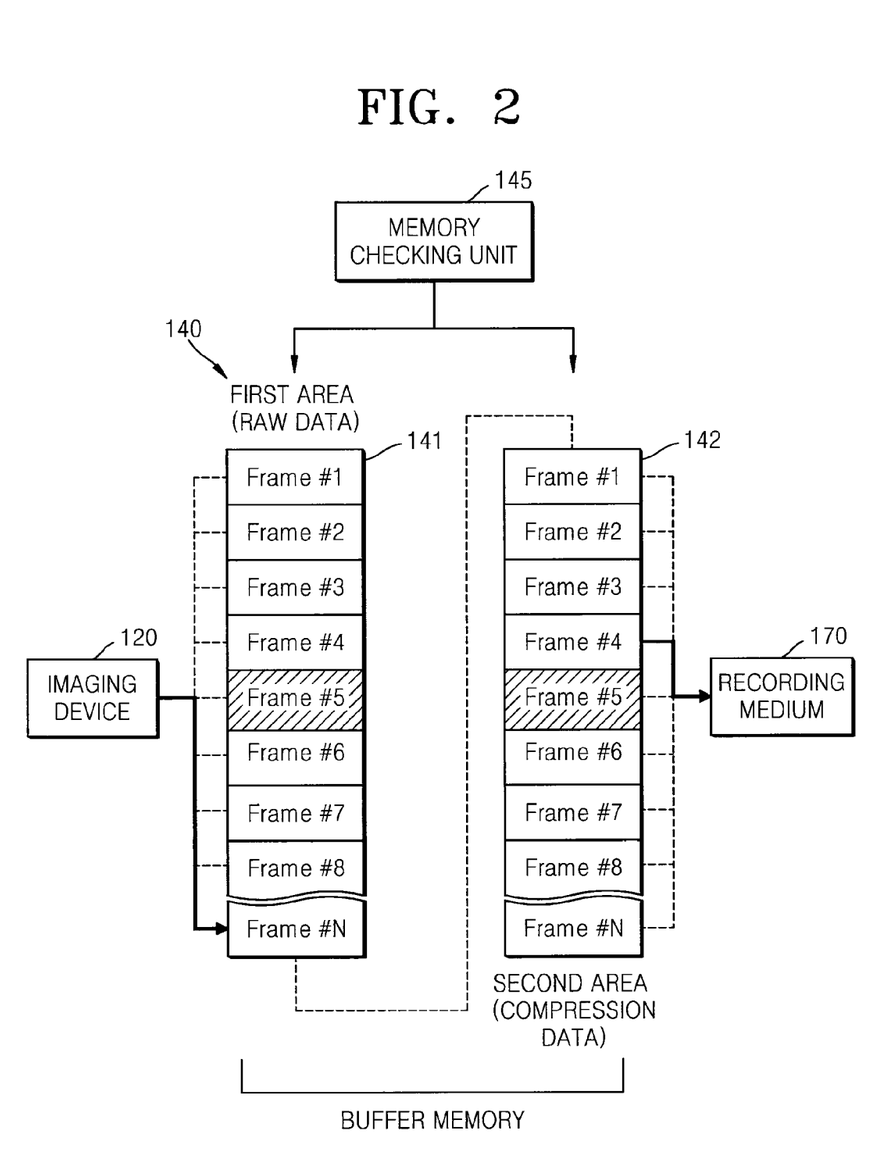
FIG. 2 is schematic diagram of an example of a data storage structure of a buffer memory.

FIG. 2 is schematic diagram of an example of a data storage structure of the buffer memory 140 according to an embodiment of the present invention. Referring to FIG. 2, a first area 141 of the buffer memory 140 serves as a buffer that temporarily stores a stream of the image data input in units of frames from the imaging device 120. In addition, the first area 141 of the buffer memory 140 provides an encoding job area, and compensates for differences between a reading speed of the imaging device 120 and an encoding speed. A second area 142 of the buffer memory 140 serves as a buffer that stores the encoded compression data in units of frames and temporarily stores compressed image frames before they are output to the recording medium 170. The image frames may be stored in the order they are obtained in each segment of the buffer memory 140. The first area 141 may sequentially accumulate raw image frames #1~#4. The second area 142 may sequentially accumulate compressed image frames #1~#N. The buffer memory 140 may include a program area (not shown) in which programs used to control each part of the digital camera and various types of data necessary for controlling the digital camera are recorded.

A memory checking unit 145 checks a data storage status when the image data obtained from the imaging device 120 is input into the buffer memory 140 and the image data stored in the buffer memory 140 is output to the recording medium 170. Additionally, the memory checking unit 145 may determine if the image data exceeds a storage capacity allocated to the buffer memory 140, and may detect a data overflow caused by the image data accumulated in the buffer memory 140. A data overflow may occur in the consecutive photographing operation because the speed of inputting the image data obtained from the imaging device 120 may be higher than that of encoding the image data or outputting the image data to the recording medium 170. An interrupt signal may be generated when data overflow occurs. The digital signal processor 150 may receive the interrupt signal indicating the data overflow. The digital signal processor 150 may perform different operations depending on a current photographing mode. The photographing modes may include a general consecutive photographing mode and an overriding mode. In the general consecutive photographing mode, the newly obtained image data after the data overflow occurs is not stored in the buffer memory 140 and a newly obtained image record is not preserved. In the overriding mode, a part of the image data stored in the buffer memory 140 is sacrificed so as to obtain space for storing the newly obtained image data after the data overflow occurs. The given image record is sacrificed in order to preserve the newly obtained image record. The recently obtained data may be prioritized according to a time when an image is obtained.

The digital signal processor 150 may perform the operations described below in a photographing operation of the digital camera.

I. Raw data for one frame is obtained from the imaging device 120 according to a predetermined drive clock, and is input into the first area 141 of the buffer memory 140;

II. The raw data input into the buffer memory 140 is extracted in units of frames and is appropriately image processed such as a screen correction;

III. The image processed data for one frame is compression encrypted in the format of JPEG and is stored in the second area 142 of the buffer memory 140; and IV. The compression memory stored in the buffer memory 140 is output to the recording medium 170 such as a memory card.

In the photographing operation I, the image data for one frame is read from the imaging device 120 on which an image of a subject is formed according to the predetermined drive clock, and the read image data is input into the first area 141 of the buffer memory 140.

In the photographing operation II, the image data stored in the buffer memory 140 is extracted to be appropriately image processed, by performing various image processing operations such as the screen correction including a white balance correction, a shape correction, a gamma correction, and the like, by using an appropriate algorithm in the digital signal processor 150.

In the photographing operation III, the encoder/decoder 160 that performs the image compression operation accesses the buffer memory 140, extracts the image data stored in the first area 141 in units of frames, compression encrypts the image data in the defined format of JPEG, and stores the compressed image data in the second area 142 of the buffer memory 140.

In the photographing operation IV, the digital signal processor 150 controls the buffer memory 140 and the recording medium 170, and stores the compression image data stored in the second area 142 of the buffer memory 140 in the recording medium 170.

Figure 3:
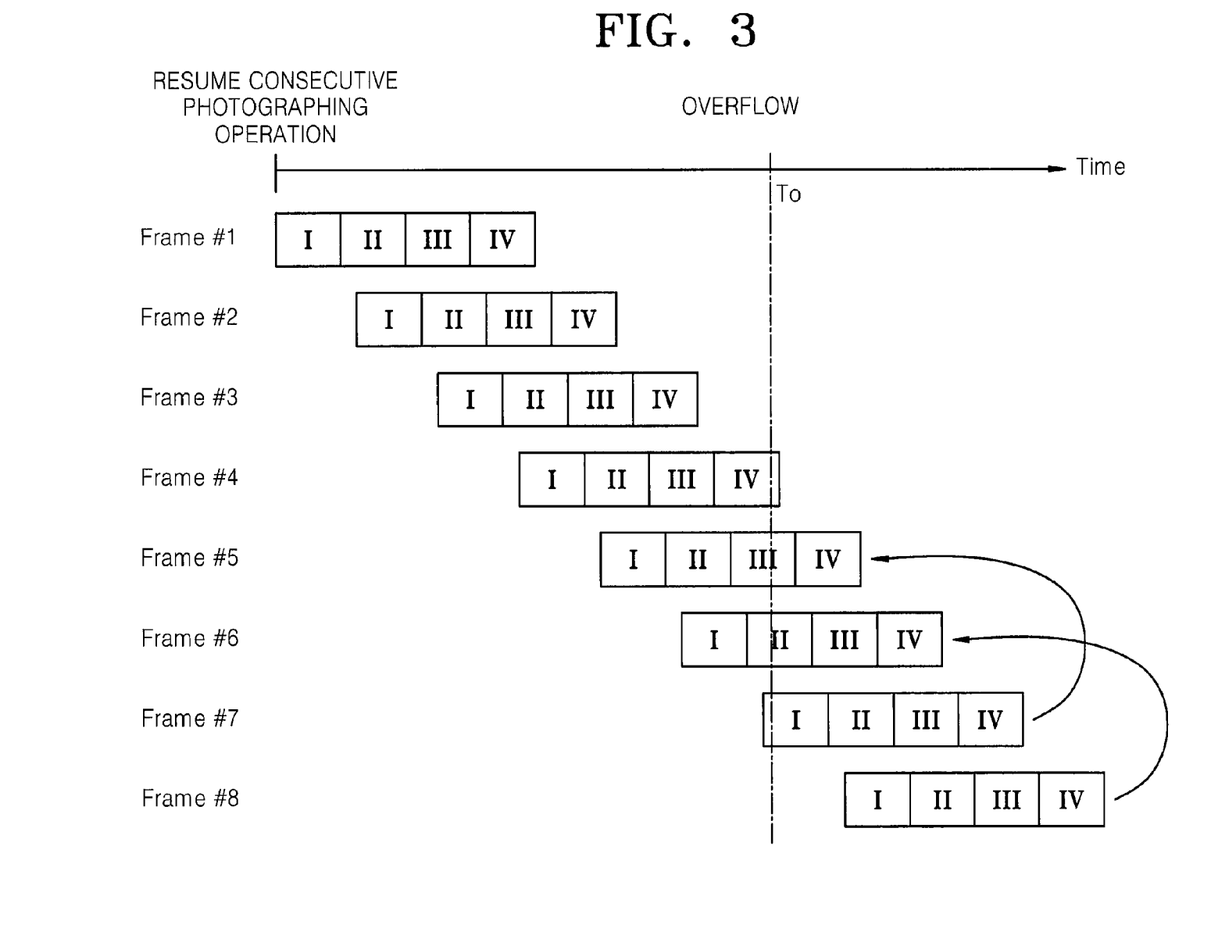
FIG. 3 is an example of a timing diagram of operations performed according to time in a consecutive photographing mode.

FIG. 3 is an illustration of a timing diagram of an example of operations performed according to time in a consecutive photographing mode. Referring to FIG. 3, a series of sequences from the photographing operations I through IV is illustrated with regard to each frame that is output from the imaging device 120 during consecutive photographing. While the image frames output from the imaging device 120 may be processed according to FIFO, the sequences with regard to the image frames may be performed in parallel.

In the photographing operation I, the image data for one frame is obtained from the imaging device 120 on which an image of a subject is formed according to a predetermined drive clock, and is input into the buffer memory 140. The number of frames obtained per second in the consecutive photographing mode may be performed as an appropriate frame per second (FPS) according to the design specification of the digital camera. For example, the image frames may be obtained at 30 FPS and stored in the buffer memory 140. The image data stored in the buffer memory 140 is appropriately image processed (the photographing operation II), and is compression encrypted according to a defined format (the photographing operation III), and is output to the recording medium 170 (the photographing operation IV). In embodiments, an overriding mode is supported in which the image frames are processed according to FIFO, and recently obtained image frames may replace previously obtained images. For example, when the buffer memory 140 reaches its storage capacity limit due to occupancy of previously obtained image frames in terms of the FIFO characteristics, i.e. in a data overflow state, the previously obtained image frames are sacrificed so as to process the recently obtained image frames. For example, when the data overflow occurs in the overriding mode, the previously obtained image frames are intentionally sacrificed and a spare storage space is secured so as to guarantee the storage of the recently obtained image frames. A photographer may establish the condition of the consecutive photographing to select on/off of the overriding mode. The selection of the overriding mode reflects a user's photographing intention that a finally photographed image is prioritized.

When it is assumed that the data overflow occurs at a time point $T_0$, the image frames obtained and accumulated previously to the time point $T_0$ when the data overflow occurs occupy the entire storage spaces of the buffer memory 140, so that no memory space remains for processing the recently obtained image frames after the time point $T_0$. In order to save the recently obtained image, an overriding operation selects a previously obtained image for sacrificing to make space available in the buffer memory. For example, if the memory checking unit 145 that monitors a storage status of the buffer memory 140 generates an interrupt signal of the data overflow, the digital signal processor 150 selects a sacrificing object from the previously obtained image frames stored in the buffer memory 140 according to a predetermined standard in response to the interrupt signal, and writes recently obtained frame data to a memory area occupied by the previously obtained image frame that is selected as the sacrificing object, i.e., overwriting, to sacrifice the previously obtained image frame, so that the recently obtained image record is preserved.

A frame being processed by operations I through IV may be selected as the frame to be sacrificed. Image data that is being processed in photographing operation IV of moving the image data from the buffer memory 140 to the recording medium 170, may be damaged if the transferred is interrupted. Additionally, if operation IV is interrupted a stability problem may occur with the recording medium 170. So, an image frame that is being transferred in photographing operation IV may not be selected for sacrifice. Image frames that are about to be stored in the recording medium 170, i.e. image frames that are currently being processed by the photographing operation III, or are finished with the photographing operation III but have not begin the photographing operation IV, may be selected as the objects to be sacrificed. For example, a frame #4 that has begun the photographing operation IV at the time point $T_0$ when the data overflow occurs is not sacrificed but is proceeded with a subsequent job; however, a frame #5 that does not begin the photographing operation IV is an object to be sacrificed. A frame #7 obtained after the time point $T_0$ is overwritten to a storage area of the previous frame #5 or the lately obtained frame #7 is stored in a corresponding memory area after the previous frame #5 is erased. In a similar manner, with regard to recently obtained data after the time point $T_0$ when the data overflow occurs, the image frame #M that experiences the photographing operation IV at a time point of obtaining the recent data is not sacrificed but the next frame #M+1 in the processing order, which may be according to FIFO, is sacrificed. For example, a recently obtained frame #8 may be stored in a corresponding memory area by sacrificing a previously obtained frame #6 that has not begun the photographing operation IV at a time point of obtaining the frame #8, i.e. at a time point of resuming the photographing operation I with regard to the frame #8.

With respect to the previously obtained frame data that is sacrificed according to the overriding operation, the raw image frames obtained in the photographing operation I and the compression image frames are removed so that all image records are removed from the buffer memory 140. For example, referring to FIG. 2, if a compression image frame #4 stored in the second area 142 of the buffer memory 140 is moved to the recording medium 170 in the photographing operation IV, a next image frame #5 that does not resume the photographing operation IV is sacrificed according to the overriding operation, and a raw image frame #5 stored in the first area 141 and a compression image frame #5 stored in the second area 142 are removed, thereby securing memory spaces for storing the raw image frames and the compression image frames regarding the image records obtained after the data overflow occurs.

Figure 4:
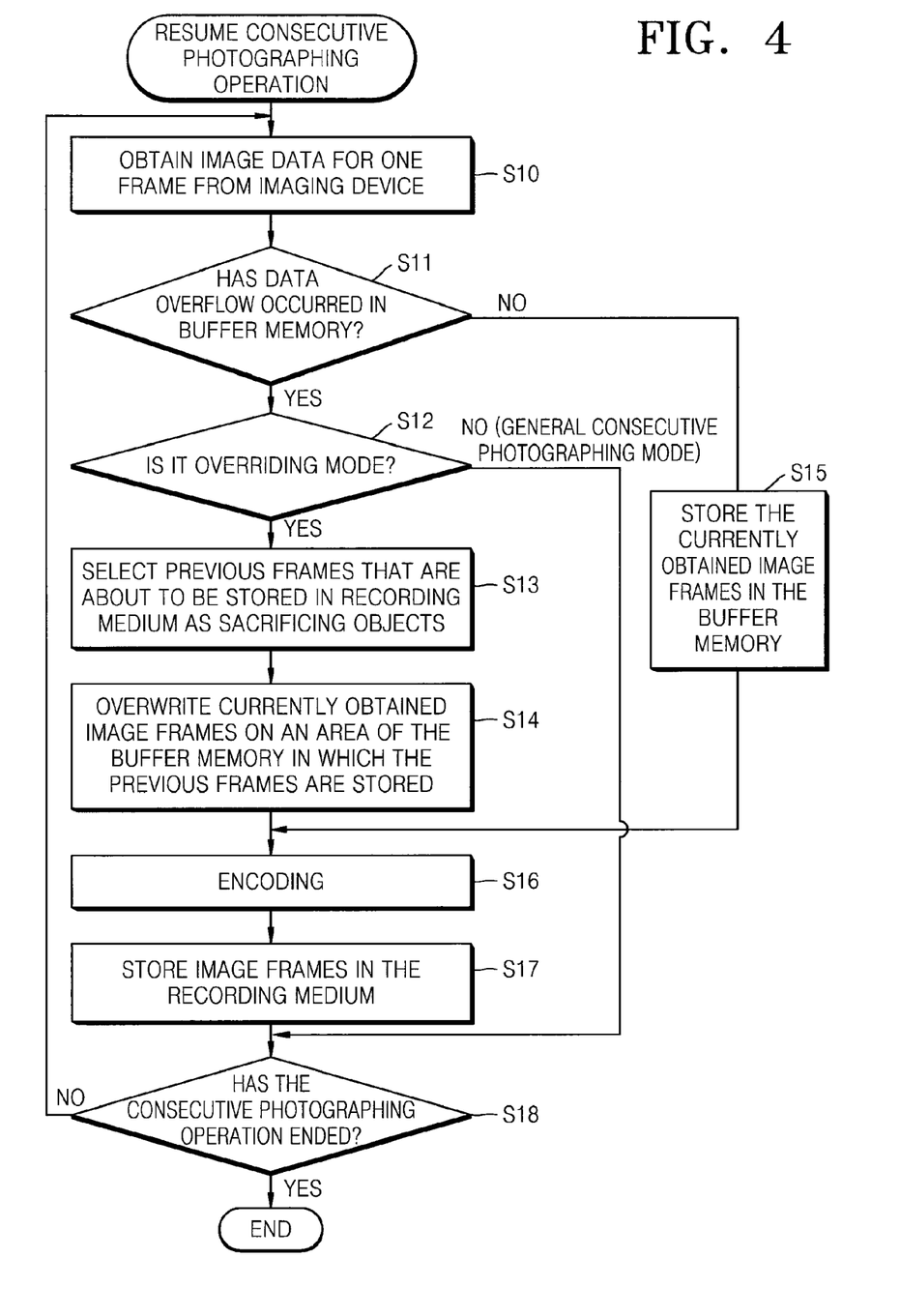
FIG. 4 is a flowchart illustrating an example of a method of controlling a digital camera.

FIG. 4 is a flowchart illustrating an example of a method of controlling a digital camera. Referring to FIG. 4, when consecutive photographing is resumed, image data for one frame is obtained from the imaging device 120 on which an image of a subject is formed in operation S10. The image frame is accumulated in the buffer memory 140. The memory checking unit 145 that monitors a storage status of the buffer memory 140 checks if a data overflow exceeding the storage capacity limit of the buffer memory 140 occurs when the image frames output by the imaging device 120 are accumulated in the buffer memory 140 according to a predetermined drive clock in operation S11. For example, the memory checking unit 145 detects the data overflow and generates an interrupt signal. The digital signal processor 150 checks a current photographing mode in operation S12, and performs a different operation in a general consecutive photographing mode and an overriding mode. In more detail, in the general consecutive photographing mode, image frames obtained after the data overflow occurs are not stored in the buffer memory 140 and currently obtained image frames are not stored. In the overriding mode, previous frame data stored in the buffer memory 140 is sacrificed and the currently obtained image frames are stored. For example, the digital signal processor 150 may select the previous frames that are not being transferred in photographing operation IV from the buffer memory 140 to the recording medium 170, but are about to be transferred to the recording medium 170 as objects to be sacrificed in operation S13. The currently obtained image frames are overwritten to a memory space occupied by the previous frames that are selected as sacrificing objects so that a record of the previous frames is sacrificed and a latest image record is preserved in operation S14. If the data overflow does not occur in the buffer memory 140 but a spare storage space remains in operation S11, the image frames obtained from the imaging device 120 are stored in the spare storage space of the buffer memory 140 in operation S15.

The image data stored in the buffer memory 140 is extracted in units of frames, is encoded according to a defined compression encoding method such as JPEG in operation S16, is stored in the form of files, and is stored in the recording medium 170 in operation S17. In the consecutive photographing mode, since a continuous photographing operation is performed in response to one shutter event, for example, it is checked if the continuous photographing operation of a designated sheet number is completed in operation S18, and the previous operations are repeatedly performed according to the checking result.

Although the photographing operations with regard to a next frame are resumed after all the photographing operations with regard to a previous frame that is output from the imaging device 120 are completed, this is just an example for the sake of understanding. In the consecutive photographing mode in which the continuous photographing operation is performed in response to one shutter event, image data in units of frames is output from the imaging device 120 according to a predetermined drive clock. A continuously obtained plurality of image frames during the consecutive photographing operation may be processed in the order the image frames were obtained, which may be described as a first-in-first-out order. Photographing operations with regard to a plurality of image frames may be performed in parallel as described with reference to FIG. 3.

The digital camera of the present invention supports an overriding mode in which a latest image record can be preserved, in spite of a memory overflow due to a consecutive photographing operation. Thus, a user's product satisfaction is increased.

The various illustrative units, logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or computer readable medium.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A digital camera comprising:
   an imaging device configured to continuously output image data of a subject in units of frames according to a predetermined drive clock, during consecutive photographing;
   a buffer memory configured to store a plurality of image frames output by the imaging device;
   a memory checking unit configured to detect a data overflow of the buffer memory;
   a digital signal processor configured to perform an overriding operation of sacrificing previously stored frame data and storing image frames recently obtained after the data overflow occurs in the buffer memory in replacement of the sacrificed framed data; and
   a recording medium configured to store the image frames in the buffer memory in the form of files.

2. The digital camera of claim 1, wherein the digital signal processor is configured to sacrifice the previous frame data, storing of which is not resumed in the recording medium, from the buffer memory.

3. The digital camera of claim 2, wherein the digital signal processor is configured to sacrifice the previous frame data that is about to be stored in the recording medium in a first-input first-output (FIFO) order.

4. The digital camera of claim 1, wherein the buffer memory is configured to store raw data obtained from the imaging device and compression data obtained by compression encoding the raw data, and
   wherein the digital signal processor is configured to sacrifice raw data and compression data of the previous frame data.

5. The digital camera of claim 1, wherein the digital signal processor is configured to overwrite the image frames that were recently obtained to a memory area in which the previous frame data is stored.

6. A digital camera comprising:
   an imaging device configured to continuously output image data of a subject in units of frames according to a predetermined drive clock, during consecutive photographing;
   a buffer memory configured to store a plurality of image frames output by the imaging device;
   a memory checking unit configured to detect a data overflow of the buffer memory;
   a digital signal processor configured to selectively perform an overriding operation of sacrificing previously stored frame data and storing image frames recently obtained after the data overflow occurs in the buffer memory in replacement of the sacrificed framed data, and configured to perform a general photographing operation of stopping storing of the image frames in the buffer memory after the data overflow occurs, according to a photographing mode selected by a user; and
   a recording medium configured to store the image frames stored in the buffer memory in the form of files.

7. The digital camera of claim 6, wherein the digital signal process in the overriding operation is configured to sacrifice previous frame data, storing of which is not resumed in the recording medium, from the buffer memory.

8. The digital camera of claim 7, wherein the digital signal processor in the overriding operation is configured to sacrifice the about to be stored in the recording medium in a FIFO order.

9. The digital camera of claim 6, wherein the image frames are overwritten that were recently obtained to a memory area in which the previous frame data is stored in the overriding operation.

10. A method of controlling a digital camera, the method comprising:
    storing a plurality of image frames output by an imaging device in units of frames in a buffer memory, during consecutive photographing;
    detecting a data overflow exceeding a storage capacity limit of the buffer memory;
    performing an overriding operation of sacrificing previously stored frame data and storing image frames recently obtained after the data overflow occurs in the buffer memory in replacement of the sacrificed framed data; and
    filing the image frames stored in the buffer memory and storing the image frames in a recording medium.

11. The method of claim 10, wherein the performing of the overriding operation comprises: sacrificing the previous frame data, storing of which is not resumed in the recording medium, form the buffer memory.

12. The method of claim 11, wherein the performing of the overriding operation comprises: sacrificing the previous frame data that is about to be stored in the recording medium in a FIFO order.

13. The method of claim 10, wherein the storing of the plurality of image frames comprises: storing raw data obtained from the imaging device and compression data obtained by compression encoding the raw data in the buffer memory,
   wherein the performing of the overriding operation comprises: sacrificing raw data and compression data of the previous frame data.

14. The method of claim 10, wherein the performing of the overriding operation comprises: overwriting the image frames that were recently obtained to a memory area in which the previous frame data is stored.

15. A method of controlling a digital camera, the method comprising:
   storing a plurality of image frames output by an imaging device in units of frames in a buffer memory, during consecutive photographing;
   detecting a data overflow exceeding a storage capacity limit of the buffer memory;
   if the data overflow is detected, checking a user's selection of a general photographing mode or an overriding mode;
   if the user's selection is found to be the overriding mode, performing an overriding operation of sacrificing previously stored frame data and storing the image frames recently obtained after the data overflow occurs in the buffer memory in replacement of the sacrificed framed data; and
   storing the image frames stored in the buffer memory in a recording medium in the form of files.

16. The method of claim 15, wherein the performing of the overriding operation comprises: sacrificing previous frame data storing of which is not resumed in the recording medium, from the buffer memory.

17. The method of claim 16, wherein the performing of the overriding operation comprises: sacrificing the previous frame data that is about to be stored in the recording medium on a FIFO order.

18. The method of claim 15, wherein the performing of the overriding operation comprises: overwriting the image frames that were recently obtained to a memory area in which the previous frame data is stored.

19. The method of claim 15, wherein the storing of the plurality of image frames comprises: storing raw data obtained from the imaging device and compression data obtained by compression encoding the raw data in the buffer memory,
   wherein the performing of the overriding operation comprises: sacrificing raw data and compression data of the previous frame data.

20. The method of claim 15, further comprising: if the user's selection is found to be the general photographing mode, stopping storing of the image frames in the buffer memory after the data overflow occurs.

* * * * *